US012630004B1

(12) United States Patent
Jia et al.

(10) Patent No.: US 12,630,004 B1
(45) Date of Patent: May 19, 2026

(54) RANGE-EXTENDING HYBRID TRANSMISSION SYSTEM

(71) Applicant: Future AIHER AI Hybrid Extended-Range Electric Powertrain System Inc., Gardena, CA (US)

(72) Inventors: Yueting Jia, Rancho Palos Verdes, CA (US); Pan Ni, Rancho Palos Verdes, CA (US); Lin Ma, Rancho Palos Verdes, CA (US)

( * ) Notice: Subject to any disclaimer, the term of this patent is extended or adjusted under 35 U.S.C. 154(b) by 0 days.

(21) Appl. No.: 19/236,820

(22) Filed: Jun. 12, 2025

(51) Int. Cl.
*B60K 6/40* (2007.10)
*B60K 6/365* (2007.10)
*B60K 6/387* (2007.10)
*B60K 6/48* (2007.10)

(52) U.S. Cl.
CPC .............. *B60K 6/40* (2013.01); *B60K 6/365* (2013.01); *B60K 6/387* (2013.01); *B60K 6/48* (2013.01); *B60K 2006/4825* (2013.01); *B60Y 2200/92* (2013.01)

(58) Field of Classification Search
CPC . B60K 6/40; B60K 6/387; B60K 6/48; B60K 2006/4825; B60K 6/442
See application file for complete search history.

(56) References Cited

U.S. PATENT DOCUMENTS

| | | | | |
|---|---|---|---|---|
| 9,873,422 B2 * | 1/2018 | Yamazaki | ............ | B60K 7/0007 |
| 2022/0274479 A1 * | 9/2022 | Beck | ........................ | B60K 6/40 |

* cited by examiner

*Primary Examiner* — Derek D Knight
(74) *Attorney, Agent, or Firm* — Tommy SF Wang; Wang IP Law Group, P.C.

(57) ABSTRACT

A range-extending hybrid transmission system includes a first rotary power source, a generator-motor, a differential, and driving wheels. The system includes a first shaft extending from the rotary power source and a first clutch disposed on the first shaft. A second clutch is spaced apart from the first clutch. A generator-motor is connected to the first shaft or to a second shaft that is mechanically connected to the first shaft and/or the second clutch. A third shaft connected to the differential is mechanically linked to the first shaft and/or the second clutch. This configuration enables the decoupling of the engine, generator-motor, and drive wheels, allowing all power sources to contribute concurrently or independently.

13 Claims, 2 Drawing Sheets

100

RANGE-EXTENDING HYBRID TRANSMISSION SYSTEM

BACKGROUND OF THE INVENTION

1. Technical Field

The present disclosure relates to a range-extending hybrid transmission system for a vehicle, and more particularly, to a hybrid transmission system configured to decouple the engine, generator-motor, and drive wheels to provide multiple drive modes.

2. Description of the Related Art

Traditional range-extending technology has faced significant challenges in the automotive market, including complex mechanical structures, slow power response, high costs, and limited performance. In the United States, these technologies were historically phased out due to poor user experience and high maintenance requirements.

However, recent advancements in the Chinese market have demonstrated new potential for range-extending technology, offering improved user value and extended driving range. Despite these advancements, existing plug-in hybrid systems still suffer from flow power output response, insufficient performance, poor driving control, and high overall vehicle costs.

Additionally, the complex mechanical structures in conventional systems can negatively impact vehicle handling, reliability, and overall driving experience.

The present disclosure addresses these challenges by providing a simplified hybrid transmission system that decouples the engine, generator-motor, and drive wheels, allowing all power sources to participate in the drive at the same time. This approach enables strong range extension with weak hybridization, improving power efficiency and performance while reducing the overall complexity of the powertrain.

SUMMARY OF THE INVENTION

Embodiments provide a range-extending hybrid transmission system for a vehicle, configured to provide multiple drive modes for improved power efficiency, performance, and energy recovery.

An embodiment of the range-extending hybrid transmission system may include a first rotary power source; a generator-motor; a differential; and driving wheels, wherein the first rotary power source is connected to a first shaft; a first clutch is disposed on the first shaft; a second clutch is spaced apart from the first clutch; the generator-motor is connected to the first shaft or a second shaft, the second shaft being mechanically connected to the first shaft and/or the second clutch; a third shaft is connected to the differential; the third shaft is mechanically connected to the first shaft and/or the second clutch; and the differential is mechanically connected to the driving wheels.

In an embodiment, the first clutch and the second clutch may be disposed on the first shaft.

In an embodiment, the first clutch and the second clutch may comprise a coaxial single-plane clutch disposed along the first shaft.

In an embodiment, the second shaft may extend vertically from the first shaft and may be connected to the generator-motor.

In an embodiment, the third shaft may be disposed downstream of the second clutch and extends vertically from the first shaft and may be connected to the differential.

In an embodiment, the second shaft may be disposed between the first clutch and the second clutch.

In an embodiment, the generator-motor may be mounted on the second shaft.

In an embodiment, the third shaft may comprise an intermediate shaft connected to a fourth shaft extending to the differential.

In an embodiment, the first clutch, the generator-motor, and the second clutch may be sequentially aligned along the first shaft.

In an embodiment, the generator-motor may be connected to the second clutch.

In an embodiment, a vertical second shaft may extend from the second clutch and is connected to a third shaft, the third shaft being connected to the differential.

In an embodiment, the second clutch may comprise a forked engagement structure configured to selectively couple the generator-motor to at least one of the first shaft and the second shaft.

In an embodiment, the generator-motor may be coaxial with the first shaft.

In an embodiment, the first clutch may comprise a coaxial single-plane clutch disposed along the first shaft, and the second clutch may comprise a forked engagement structure configured to selectively couple the generator-motor to the first shaft and/or the second shaft.

BRIEF DESCRIPTION OF DRAWINGS

The above and other aspects, features, and advantages of embodiments of the disclosure will be more apparent from the following description taken in conjunction with the accompanying drawings, in which.

DETAILED DESCRIPTION OF THE INVENTION

Figure 1:
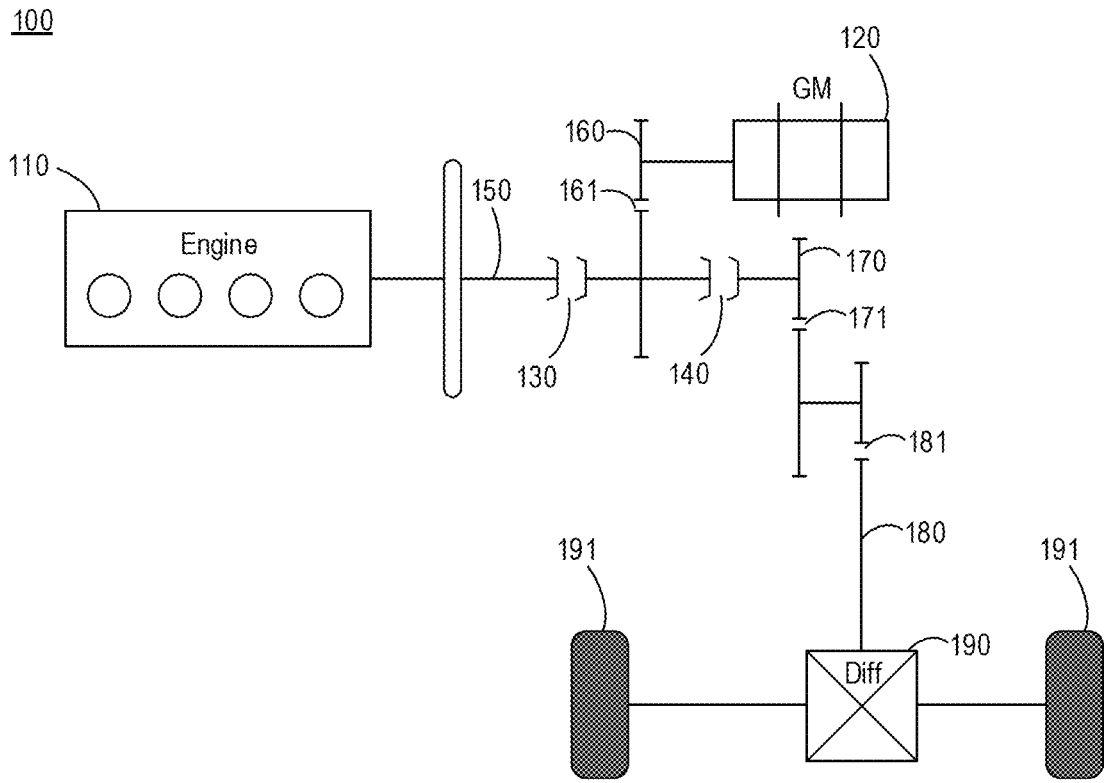
FIG. 1 is a schematic diagram of a range-extending hybrid transmission system for a vehicle according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Various embodiments do not have to be exclusive nor limit the disclosure. For example, specific shapes, configurations, and characteristics of an embodiment may be used or implemented in another embodiment In the drawings, sizes, thicknesses, ratios, and dimensions of elements may be exaggerated for ease of description and for clarity.

It will be understood that, although the terms "first," "second," etc. may be used herein to describe various elements, these elements should not be limited by these terms. These terms are only used to distinguish one element from another. For example, a first element may be referred to as a second element, and similarly, a second element may be referred to as a first element without departing from the scope of the disclosure.

As used herein, the singular forms "a," "an," and "the" are intended to include the plural forms as well, unless the context clearly indicates otherwise.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

As used herein, the term "mechanically connected" may refer to a physical and functional connection between components that enables the direct or indirect transfer of torque and rotational power through mechanical linkages, such as shafts, clutches, gears, or differentials, without relying solely on electrical, hydraulic, or pneumatic coupling. This may include both direct coupling, where components are physically joined, and indirect coupling, where power is transmitted through intermediate mechanical elements.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
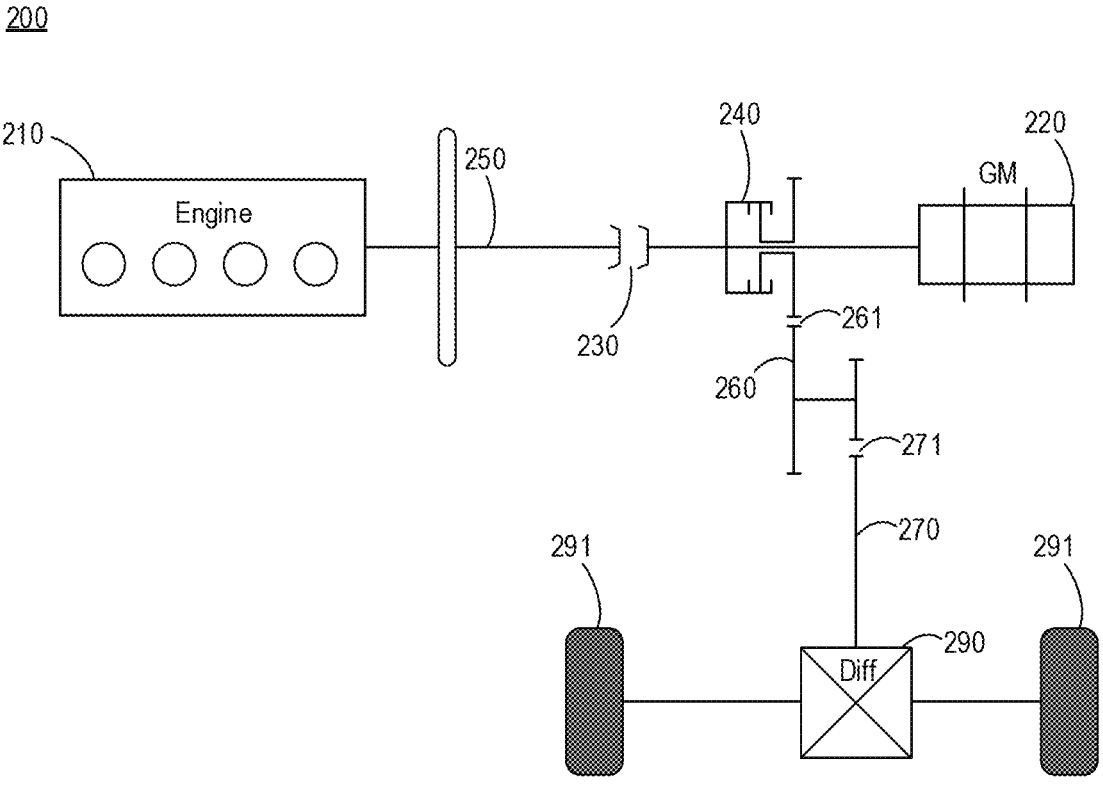
FIG. 2 is a schematic diagram of a range-extending hybrid transmission system for a vehicle according to another embodiment of the disclosure.

FIGS. 1 and 2 are schematic diagrams of a range-extending hybrid transmission system 100 for a vehicle according to embodiments of the disclosure.

The system may include a first rotary power source 110, such as an internal combustion engine, mechanically connected to a first shaft 150. A first clutch 130 may be disposed on the first shaft 150 and may selectively engage or disengage the engine 110 from downstream components along the powertrain.

Spaced apart from the first clutch 130 may be a second clutch 140, which may also be disposed along the first shaft 150. A generator-motor 120 may be connected to either the first shaft 150 directly or through a second shaft 160, which may extend vertically and be mechanically connected to the first shaft 150 and/or to the second clutch 140. A bevel gear 161 may be mounted on the second shaft 160 and may engage the first shaft 150 to enable torque transmission between the generator-motor 120 and the powertrain.

A third shaft 170 may extend horizontally downstream of the second clutch 140 and may be mechanically linked to the first shaft 150 and/or the second clutch 140. A bevel gear 171 may be disposed on the third shaft 170 and may mesh with a corresponding bevel gear 181 mounted on a fourth shaft 180, which may extend vertically and connect to a differential 190.

The differential 190 may be mechanically connected to driving wheels 200, and may function to distribute torque to left and right wheel axles. Although not shown in the drawing, a gearbox 210 may be interposed between the third shaft 170 and the differential 190 to provide additional torque modulation or two-speed operation.

This configuration may allow the engine 110, generator-motor 120, and driving wheels 200 to be mechanically decoupled via the first clutch 130 and the second clutch 140. The mechanical connectivity among components may enable multiple drive modes, including pure electric drive, engine-assisted drive, generator-only operation, or regenerative braking. This arrangement may improve power efficiency, system modularity, and range-extending capability while reducing mechanical complexity.

Referring to FIG. 1, a first embodiment of a range-extending hybrid transmission system 100 may include a first clutch 130 and a second clutch 140 disposed on a first shaft 150. The first shaft 150 may extend horizontally from a first rotary power source such as an engine 110, and may serve as a common mechanical axis for coupling and decoupling multiple power sources.

The first clutch 130 may be positioned between the engine 110 and downstream components of the drivetrain. The second clutch 140 may be spaced apart from the first clutch 130 along the same shaft 150, allowing for independent or combined engagement of power sources such as the generator-motor 120.

This arrangement may enable mechanical decoupling between the engine 110, the generator-motor 120, and the driving wheels 200, by selectively actuating either or both of the clutches 130 and 140. The use of both clutches on a common shaft 150 may simplify the overall shaft layout while supporting multiple drive modes with reduced mechanical complexity.

In an embodiment, the first clutch 130 and the second clutch 140 each may comprise a coaxial single-plane clutch disposed along a first shaft 150. The first shaft 150 may extend horizontally from a first rotary power source such as an engine 110, and may also support mechanical connectivity with a generator-motor 120 and downstream drivetrain components.

Each of the first clutch 130 and second clutch 140 may operate independently, while remaining coaxially aligned on the first shaft 150. A coaxial single-plane clutch refers to a clutch configuration in which the input and output members are aligned along a common rotational axis and coupled or decoupled through a single-plane engagement surface. This arrangement may simplify mechanical design, reduce axial footprint, and allow discrete power flow control from the engine 110 or the generator-motor 120.

This structural configuration may enable a range of drive modes based on the operational states of the engine 110, generator-motor 120, first clutch 130, and second clutch 140, as outlined in Table 1 below.

TABLE 1

| Drive Modes of Range-Extending Hybrid Transmission System 100 | | | | |
| --- | --- | --- | --- | --- |
| Drive Mode | Engine 110 | GM 120 | First Clutch 130 | Second Clutch 140 |
| Pure Electric Drive | Off | Motor | Open | Closed |
| Range Extender | On | Generator | Closed | Open |

TABLE 1-continued

| Drive Mode | Engine 110 | GM 120 | First Clutch 130 | Second Clutch 140 |
|---|---|---|---|---|
| | Drive Modes of Range-Extending Hybrid Transmission System 100 | | | |
| Engine Drive | On | No power output or passive | Closed | Closed |
| Hybrid Drive | On | Motor | Closed | Closed |
| Generating Electricity While Driving | On | Generator | Closed | Closed |
| Generating Electricity While Parking | On | Generator | Closed | Open |
| Regenerative Braking | Off | Generator | Open | Closed |

In a pure electric drive mode, power may flow from the generator-motor 120, operating in motor mode, through the second clutch 140, into the third shaft 170, through bevel gear 171, down the fourth shaft 180, and into the differential 190, which drives the wheels 200. The engine 110 may be off, and the first clutch 130 may be disengaged.

In a range extender mode (Engine charges battery), the engine 110 may drive the generator-motor 120, operating in generator mode, to produce electrical energy. In this configuration, the first clutch 130 may be engaged while the second clutch 140 remains open, thus isolating the drivetrain from the generator-motor.

In an engine drive mode, torque may flow from the engine 110, through both the first clutch 130 and the second clutch 140, and into the generator-motor 120 (in passive state), then into the third shaft 170, and eventually to the driving wheels 200 through the differential 190. In the engine drive mode, the generator-motor may be mechanically rotated but electronically controlled to provide no torque or electrical output. This may avoid internal resistance or regenerative interference, while protecting the motor from damage.

In a hybrid drive mode (Combined propulsion), both the engine 110 and the generator-motor 120 may simultaneously deliver torque to the drivetrain. This occurs when both clutches 130 and 140 are engaged, enabling combined power delivery through the common shaft system.

In a generating electricity while driving mode, the engine 110 may drive the generator-motor 120 through the first clutch 130 while the second clutch 140 remains engaged. The vehicle may continue to move while the generator-motor 120 produces electrical energy.

In a generating electricity while parking mode, the engine 110 may rotate the generator-motor 120 via the first clutch 130, while the second clutch 140 is disengaged. The drivetrain is isolated, and the vehicle remains stationary during power generation.

In a regenerative braking mode, the generator-motor 120 may operate in generator mode while the engine 110 is off. Torque from the wheels 200 may flow backward through the differential 190, fourth shaft 180, bevel gear 171, and third shaft 170 into the generator-motor 120 through the second clutch 140, with the first clutch 130 remaining open.

These operating modes may be enabled through the selective engagement of the coaxial single-plane clutches 130 and 140, allowing the engine 110, generator-motor 120, and drivetrain to be mechanically coupled or decoupled as needed. This mechanical flexibility may improve driving efficiency, energy recovery, and user control across a range of operating scenarios.

Referring to FIG. 1, in an embodiment of the range-extending hybrid transmission system 100, a second shaft 160 may extend vertically from a first shaft 150 and may be connected to a generator-motor 120. The first shaft 150 may extend horizontally from a first rotary power source 110, such as an internal combustion engine, and may support both a first clutch 130 and a second clutch 140 disposed in spaced-apart positions along the same axis.

The vertical second shaft 160 may be mounted perpendicular to the first shaft 150, and may be positioned between the first clutch 130 and the second clutch 140. The second shaft 160 may include a bevel gear 161 to enable torque transfer between the first shaft 150 and the generator-motor 120.

The second shaft 160 may enable mechanical coupling of the generator-motor 120 to the drivetrain through its engagement with the first shaft 150, and may be positioned between the first clutch 130 and the second clutch 140. Depending on the selected operating mode, the generator-motor 120 may be connected to or isolated from the drivetrain via the clutches. This structure may support various power modes, including pure electric drive, regenerative braking, engine-driven generation, and hybrid propulsion, while allowing spatial and mechanical decoupling among the generator-motor 120, engine 110, and driving wheels 200.

Referring again to FIG. 1, a third shaft 170 may be disposed downstream of the second clutch 140 and may extend vertically from the first shaft 150. The third shaft 170 may be mechanically connected to a differential 190 through a torque-transferring path. This layout may support pure electric drive and regenerative braking modes when the first clutch 130 is open and the second clutch 140 is closed, allowing the generator-motor 120 to drive or receive torque from the wheels via the drivetrain.

The second shaft 160, which is connected to the generator-motor 120, may be disposed between the first clutch 130 and the second clutch 140 along the first shaft 150. This spatial relationship may permit independent or combined engagement of the generator-motor 120 with the engine 110 or drivetrain depending on clutch actuation, which is particularly useful in range extender or hybrid drive modes.

The generator-motor 120 may be mounted on the second shaft 160, which may extend perpendicularly from the first shaft 150. This mounting arrangement may allow efficient packaging of the generator-motor above or beside the main drivetrain axis and may reduce lateral transmission width. In engine charging or generating electricity while parking modes, the engine 110 may drive the generator-motor 120 through the first clutch 130 while the second clutch 140 remains open, isolating the drive wheels.

The third shaft 170 may further comprise an intermediate shaft portion that transitions into a fourth shaft 180, which may extend vertically to connect with the differential 190. This multi-axis layout may include bevel gear interfaces 171 and 181 and may support torque redirection in configurations requiring compact drivetrain packaging. In engine drive or hybrid drive modes, torque may be transmitted from the engine 110, through both clutches, and down the third and fourth shafts into the differential 190, delivering power to the driving wheels 200.

Referring to FIG. 2, another embodiment of the range-extending hybrid transmission system 200 may include a first clutch 230, a second clutch 240, and a generator-motor 220, sequentially aligned along a common first shaft 250. The first shaft 250 may extend horizontally from a first rotary power source such as an engine 210, through the first clutch 230 and second clutch 240, and into the generator-motor 220.

In this configuration, the first clutch 230 may be disposed between the engine 210 and the second clutch 240, and the second clutch 240 may be positioned between the first clutch 230 and the generator-motor 220. A second shaft 260 may extend vertically from the second clutch 240 and may include a bevel gear 261 to transmit power to a third shaft 270, which is coupled to the differential 290 through a bevel gear 271.

This inline arrangement may enable modular drivetrain packaging, torque flow control, and multiple drive modes, such as pure electric drive, engine drive, hybrid drive, and regenerative braking, depending on the selective engagement of the first clutch 230 and second clutch 240.

Referring to FIG. 2, the generator-motor 220 may be mechanically connected to the second clutch 240, which may be positioned between the first clutch 230 and the generator-motor 220 along the first shaft 250. The generator-motor 220 may receive or deliver torque through the second clutch 240, depending on the selected operating mode. For example, in pure electric drive or regenerative braking modes, torque may flow through the second clutch 240 while the first clutch 230 remains open, isolating the engine 210.

The second shaft 260 may extend vertically from the second clutch 240 and may include a bevel gear 261 to transmit torque to a third shaft 270. The third shaft 270 may in turn be coupled to the differential 290 through a meshing bevel gear 271. This vertical-to-horizontal torque redirection path may support both forward propulsion and energy recovery. In regenerative braking, rotational energy from the driving wheels 291 may pass through the differential 290, third shaft 270, and second shaft 260 to the generator-motor 220, which operates in generator mode.

The second clutch 240 may comprise a forked engagement structure that enables selective coupling of the generator-motor 220 to either the first shaft 250 or the second shaft 260, or both. This arrangement may allow torque to be selectively directed for propulsion, regeneration, or electrical generation. In engine charging while parking, the forked clutch 240 may engage the generator-motor 220 with the first shaft 250 (driven by the engine 210) while disengaging the second shaft 260, isolating the drivetrain. In contrast, hybrid drive may involve simultaneous engagement of both sides of the forked clutch 240, allowing joint contribution from both the engine 210 and the generator-motor 220 to the drivetrain.

The generator-motor 220 may be coaxial with the first shaft 250, meaning the stator and rotor of the generator-motor may share a common rotational axis with the shaft connecting the engine 210 to the drivetrain. This coaxial alignment may reduce packaging volume, improve rotational efficiency, and facilitate clean integration with the forked second clutch 240. Such a configuration may be particularly useful in systems requiring seamless transitions between electric drive, engine drive, and hybrid drive modes without the need for additional clutches or gear transitions.

In FIGS. 1 and 2, the first clutch 130 and 230, and the second clutch 140 may comprise a coaxial single-plane clutch disposed along the first shaft 150 and 250. A coaxial single-plane clutch may include an input and output element aligned on a common rotational axis and configured to engage or disengage torque transfer across a single clutch interface. This configuration may simplify axial packaging and permit clean mechanical disconnection between the engine 210 and the downstream powertrain.

In FIG. 2, the second clutch 240 may comprise a forked engagement structure that may be configured to selectively couple the generator-motor 220 to one or both of the first shaft 250 and the second shaft 260. This arrangement may allow the system to selectively control whether the generator-motor 220 engages in propulsion, generation, or remains idle. For example, in range extender or charging while parked modes, the forked clutch 240 may couple the generator-motor 220 only to the first shaft 250 (driven by the engine 210) while isolating the drivetrain. In pure electric drive or regenerative braking, the forked clutch 240 may couple the generator-motor 220 to the second shaft 260, enabling torque flow to or from the differential 290.

In FIG. 2, the combination of the coaxial single-plane first clutch 230 and the forked second clutch 240 may enable precise mechanical routing of torque among the engine 210, generator-motor 220, and driving wheels 291 while minimizing mechanical complexity. This architecture may also facilitate seamless transitions between engine-only, electric-only, and hybrid drive modes depending on the clutch actuation state.

TABLE 2

| Drive Mode | Engine 210 | GM 220 | First Clutch 230 | Second Clutch 240 |
|---|---|---|---|---|
| | | Drive Modes of Range-Extending Hybrid Transmission System 200 | | |
| Pure Electric Drive | Off | Motor | Open | Closed |
| Range Extender | On | Generator | Closed | Open |
| Engine Drive | On | No power output or passive | Closed | Closed |
| Hybrid Drive | On | Motor | Closed | Closed |
| Generating Electricity While Driving | On | Generator | Closed | Closed |
| Generating Electricity While Parking | On | Generator | Closed | Open |
| Regenerative Braking | Off | Generator | Open | Closed |

In a pure electric drive mode, power may flow from the generator-motor 220, operating in motor mode, through the second clutch 240, into the second shaft 260, and via bevel gear 261 and third shaft 270 to the differential 290, which transmits torque to the driving wheels 291. In this mode, the first clutch 230 may be disengaged to isolate the engine 210.

In a range extender mode (engine charges battery), the engine 210 may be coupled to the generator-motor 220 through the first clutch 230, while the second clutch 240 is disengaged. This arrangement allows the engine to drive the generator-motor in generator mode to produce electrical power, without transmitting torque to the wheels 291.

In an engine drive mode, torque may flow from the engine 210, through both the first clutch 230 and the second clutch 240, into the generator-motor 220 (in a passive state), and then through the second shaft 260, bevel gear 261, and third shaft 270 to the differential 290 and driving wheels 291. In the engine drive mode, the generator-motor may be mechanically rotated but electronically controlled to provide no torque or electrical output. This may avoid internal resistance or regenerative interference, while protecting the motor from damage.

In a hybrid drive mode (combined propulsion), the engine 210 and generator-motor 220 may both supply torque to the drivetrain. The first clutch 230 and second clutch 240 may be engaged to enable torque contribution from both sources along the first shaft 250, coordinated into the same drive path.

In a generating electricity while driving mode, the engine 210 may drive the generator-motor 220 through the first clutch 230, while the second clutch 240 remains engaged to allow the vehicle to continue moving. The generator-motor may operate in generator mode to charge the battery during propulsion.

In a generating electricity while parking mode, the first clutch 230 may be engaged and the second clutch 240 disengaged, allowing the engine 210 to rotate the generator-motor 220 via the first shaft 250 while isolating the drivetrain. The vehicle remains stationary while electricity is generated.

In a regenerative braking mode, the generator-motor 220 may operate in generator mode while the engine 210 is off and the first clutch 230 is disengaged. Torque from the driving wheels 291 may be transferred through the differential 290, third shaft 270, and second shaft 260 into the generator-motor, recovering energy to the battery.

The present disclosure may provide a range-extending hybrid transmission system that overcomes the limitations of conventional plug-in hybrid technologies by employing a simplified mechanical layout with a dual-clutch architecture, wherein the clutches operate independently to decouple the engine, generator-motor, and drive wheels. This configuration enables each power source to contribute individually or cooperatively across various drive modes, including pure electric drive, engine drive, hybrid propulsion, and regenerative braking. The system may support strong range extension while maintaining weak hybridization, optimizing performance, responsiveness, and energy efficiency. By reducing the complexity of the shaft system and overall powertrain layout, the disclosure may improve volume power density, enhance packaging compactness, and deliver a more refined and cost-effective driving experience.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

The invention claimed is:

1. A range-extending hybrid transmission system comprising:
   a first rotary power source;
   a generator-motor;
   a differential; and
   driving wheels, wherein
   the first rotary power source is mechanically connected to a first shaft;
   a first clutch and a second clutch sequentially disposed along the first shaft and configured to selectively and independently couple or decouple the first rotary power source, the generator-motor, and a drivetrain;
   a second shaft mechanically connected to the generator motor and extending from the first shaft between the first clutch and the second clutch;
   a third shaft extending from the first shaft downstream of the second clutch and mechanically connected to the differential; and
   the differential being mechanically connected to the driving wheels.

2. The range-extending hybrid transmission system of claim 1, wherein the first clutch and the second clutch comprise a coaxial single-plane clutch disposed along the first shaft.

3. The range-extending hybrid transmission system of claim 1, wherein the generator-motor is mounted on the second shaft.

4. The range-extending hybrid transmission system of claim 1, wherein the third shaft comprises an intermediate shaft connected to a fourth shaft extending to the differential.

5. The range-extending hybrid transmission system of claim 1, wherein the second clutch is configured to selectively couple the generator-motor to at least one of the first shaft and the second shaft.

6. The range-extending hybrid transmission system of claim 1, wherein the first clutch comprises a coaxial single-plane clutch disposed along the first shaft, and the second clutch is configured to selectively couple the generator-motor to the first shaft and/or the second shaft.

7. The range-extending hybrid transmission system of claim 1, wherein the first rotary power source, the generator-motor, the first clutch, and the second clutch are configured to establish a plurality of operating modes comprising:
   a pure electric drive mode in which the first rotary power source is off, the generator-motor operates as a motor, the first clutch is open, and the second clutch is closed;
   a range extender mode in which the first rotary power source is on, the generator-motor operates as a generator, the first clutch is closed, and the second clutch is open;
   an engine-drive mode in which the first rotary power source is on the generator-motor provides no power output or operates passively, and both the first clutch and the second clutch are closed;
   a hybrid drive mode in which the first rotary power source is on, the generator-motor operates as a motor, and both the first clutch and the second clutch are closed;
   a generating-electricity-while-driving mode in which the first rotary power source is on, the generator-motor operates as a generator, and both the first clutch and the second clutch are closed;
   a generating-electricity-while-parking mode in which the first rotary power source is on, the generator motor operates as a generator, the first clutch is closed, and the second clutch is open; and
   a regenerative-braking mode in which the first rotary power source is off, the generator-motor operates as a generator, the first clutch is open, and the second clutch is closed.

8. A range extending hybrid transmission system comprising:
   an engine,
   a generator-motor;
   a differential; and
   driving wheels, wherein
   the engine is mechanically connected to a first shaft;
   a first clutch is disposed on the first shaft and configured to selectively couple of decouple the engine from the first shaft;
   the generator motor is coaxial with the first shaft;

a second clutch is disposed on the first shaft downstream of the generator-motor and is configured to selectively couple the generator-motor to at least one of the first shaft and a second shaft;

the second shaft extends from the second clutch and is mechanically connected to a third shaft;

the third shaft is mechanically connected to the differential; and the differential is mechanically connected to the driving wheels.

9. The range-extending hybrid transmission system of claim 8, wherein the second clutch is configured to selectively couple the generator-motor to the first shaft and to the second shaft.

10. The range-extending hybrid transmission system of claim 8, wherein the generator-motor is directly mounted on the first shaft.

11. The range-extending hybrid transmission system of claim 8, wherein the second shaft extends vertically from the second clutch.

12. The range-extending hybrid transmission system of claim 8, wherein the first clutch comprises a coaxial single-plane clutch disposed along the first shaft.

13. The range-extending hybrid transmission system of claim 8, wherein the engine, the generator-motor, the first clutch, and the second clutch are configured to establish a plurality of operating modes comprising:

a pure electric drive mode in which the engine is off, the generator-motor operates as a motor, the first clutch is open, and the second clutch is closed;

a range extender mode in which the engine is on, the generator-motor operates as a generator, the first clutch is closed, and the second clutch is open, an engine-drive mode in which the engine is on, the generator-motor provides no power output or operates passively, and the first clutch and the second clutch are both closed;

a hybrid-drive mode in which the engine is on the generator-motor operates as a motor, and the first clutch and the second clutch are both closed;

a generating-electricity-while-driving-mode in which the engine is on, the generator-motor operates as a generator, and the first clutch and the second clutch are both closed;

a generating-electricity-while-parking mode in which the engine is on, the generator-motor operates as a generator, the first clutch is closed, and the second clutch is open; and a regenerative-braking mode in which the engine is off, the generator-motor operates as a generator the first clutch is open, and the second clutch is closed.

\* \* \* \* \*